Nov. 28, 1933.  A. J. KERCHER  1,937,042
ELECTRICAL HEATING SYSTEM AND APPARATUS
Filed Nov. 11, 1929  3 Sheets-Sheet 3
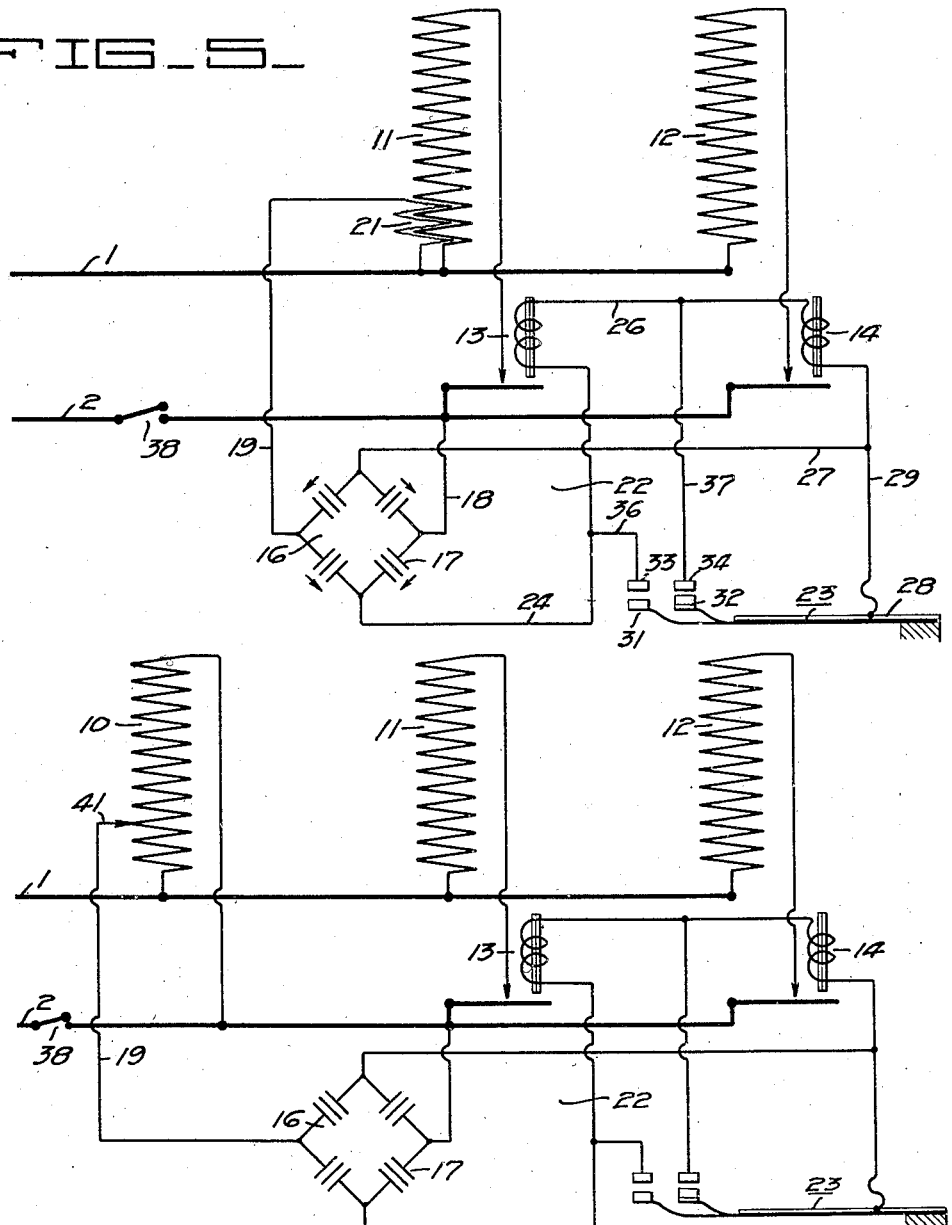
INVENTOR.
Arthur J. Kercher Patented Nov. 28, 1933

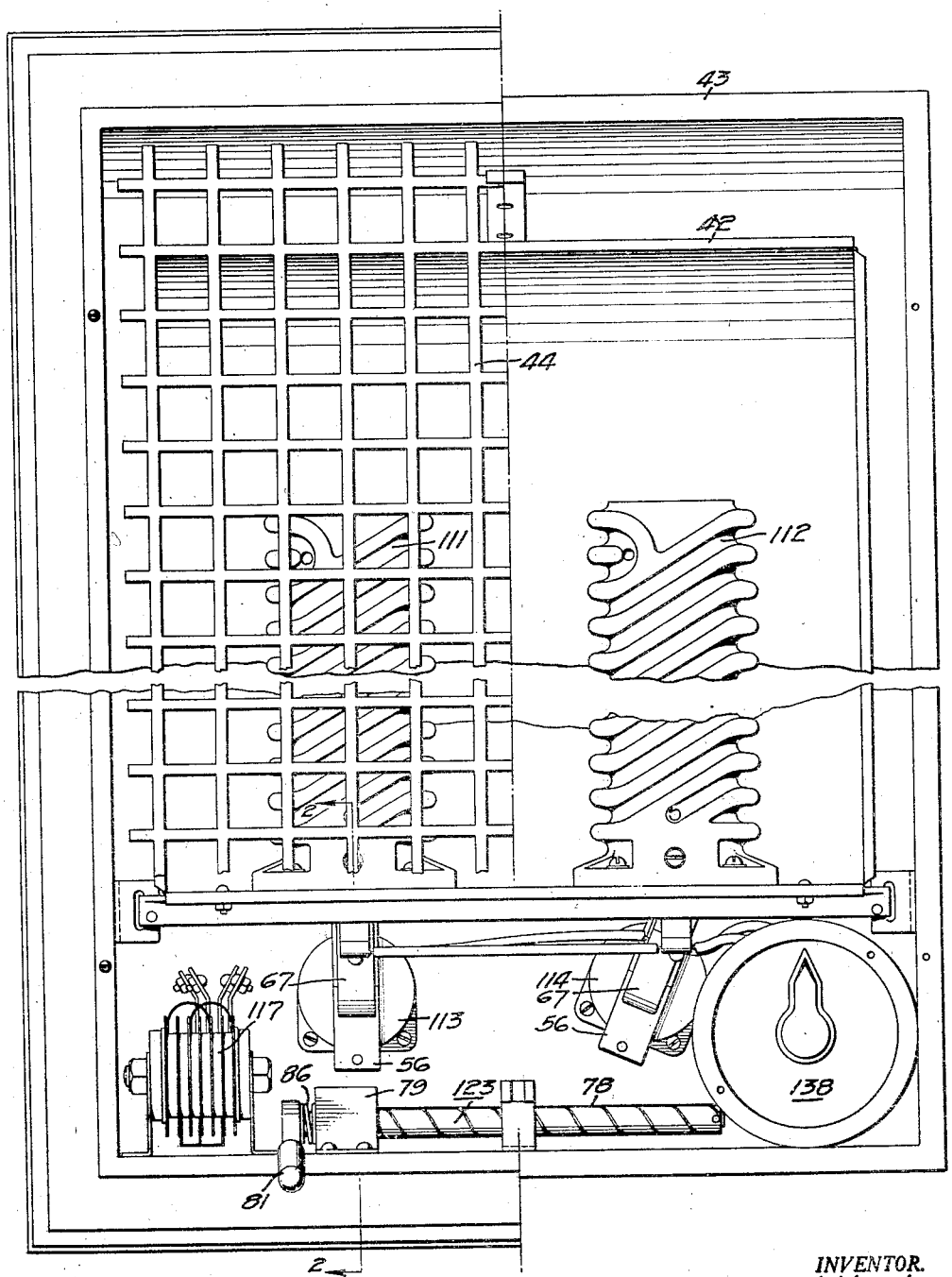
Nov. 28, 1933.    A. J. KERCHER    1,937,042
ELECTRICAL HEATING SYSTEM AND APPARATUS
Filed Nov. 11, 1929    3 Sheets-Sheet 1
FIG_1_
INVENTOR.
Arthur J. Kercher
BY White, Prost, Hehr o Lothrop
ATTORNEYS.

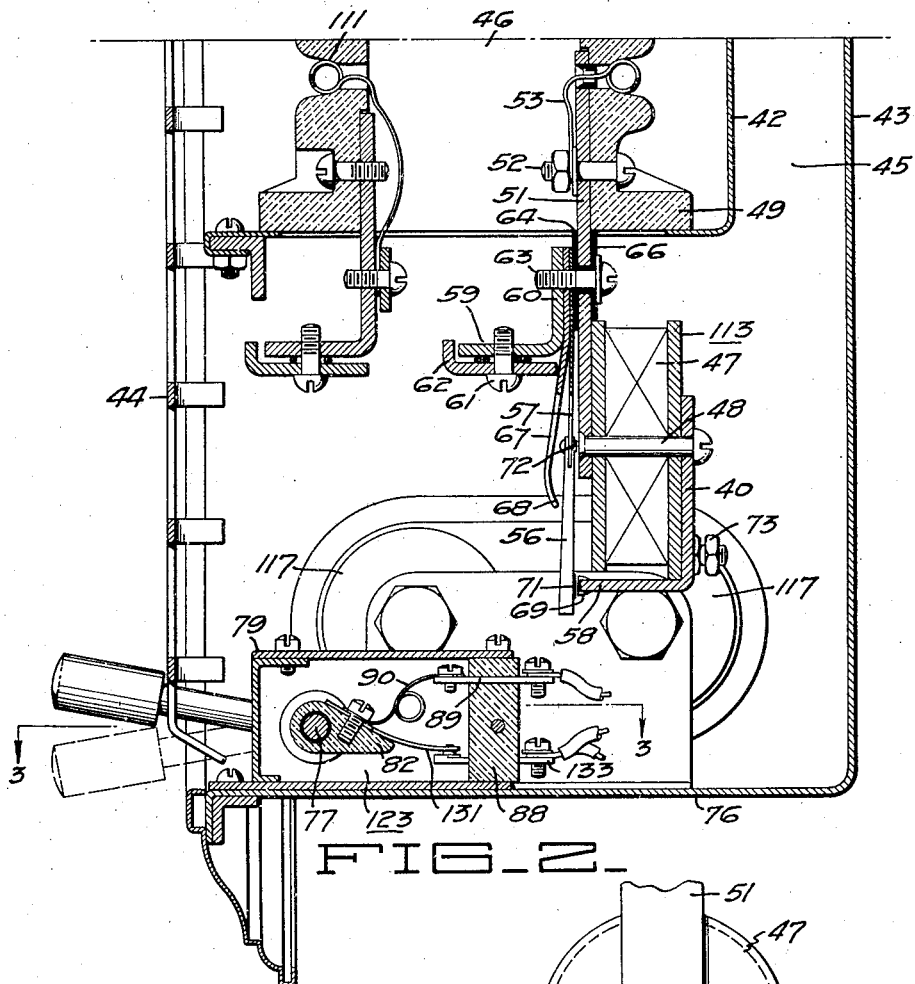
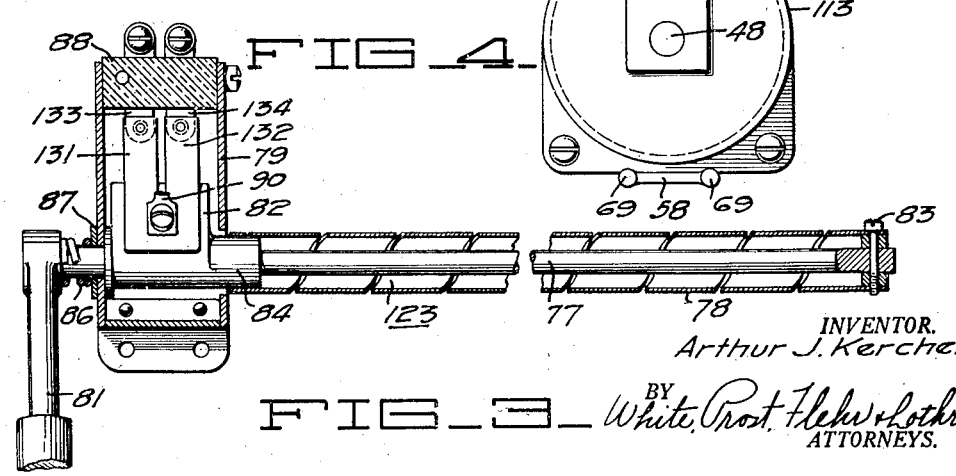

1,937,042

UNITED STATES PATENT OFFICE 1,937,042

ELECTRICAL HEATING SYSTEM AND APPARATUS

Arthur J. Kercher, Berkeley, Calif., assignor of one-half to William Wesley Hicks, San Francisco, Calif.

Application November 11, 1929
Serial No. 406,374

3 Claims. (Cl. 219—20)

This invention relates generally to electrical heating systems in which the supply of current to one or more electrical heating elements is controlled automatically, and to apparatus for use in such systems.

It is a general object of the present invention to devise a system of the above character which can be successfully operated from alternating current supply lines, and which will employ electrical parts of utmost simplicity.

It is a further object of the present invention to devise a novel automatic electrical heating system which will afford relatively close temperature control and will avoid detrimental arcing between the contacts employed.

It is a further object of the present invention to devise novel apparatus for use in the above system, which for example can be in the form of a heater automatically controlled in accordance with the temperature of a room being heated.

Further objects of the present invention will appear from the following description in which I have set forth certain preferred and representative embodiments of my invention. It is to be understood that the appended claims are to be accorded a range of equivalents consistent with the state of the prior art.

Referring to the drawings:

Figure 1 is a front elevational view illustrating an electrical air heater incorporating the principles of the present invention, the front grille being removed in the right hand half of the figure.

Fig. 2 is a cross sectional view taken along the line 2—2 of Fig. 1.

Fig. 3 is a detail illustrating the temperature responsive switch incorporated in the apparatus of Fig. 1, this view being taken along the line 3—3 of Fig. 2.

Fig. 4 is a detail illustrating a part of one of the relays incorporated in the apparatus of Fig. 1.

Fig. 5 is a circuit diagram illustrating the manner in which the parts of the apparatus of Figs. 1 to 4 inclusive are connected together.

Fig. 6 is a circuit diagram illustrating a modification of my system.

In electrical systems which are utilized for heating a certain medium, as for example the air within a room, the electrical heating element or elements are sometimes controlled automatically, to prevent the temperature of the medium from becoming excessive, or to maintain the temperature near a desired value. A system and apparatus of this character which is controlled according to the temperature of air within a room, is disclosed in Patent No. 1,704,479 granted to Arthur J. Kercher and William W. Hicks. When such systems are operated from alternating current, it has previously been the practice to employ special expensive contacting devices in order to properly make and break the electrical circuit or circuits, and even when such special devices were employed, arcing frequently occurs between the contacts and the operation is not as reliable as desired. To obviate these difficulties, and in order to provide a system of this character which can be incorporated in apparatus of simple and relatively cheap construction, the present invention is characterized by the use of contacting relays operating from unidirectional current, this current being obtained by suitable rectifying means.

Referring first to the circuit diagram of Fig. 5 for a description of a system utilizing my invention, I have shown electrical heating elements 11 and 12, such as are commonly employed for heating a given object or medium, such as air, and which present electrical resistance or other form of impedance which will convert electrical energy into heat. Corresponding terminals of elements 11 and 12 are connected to the alternating current supply line 1. The other corresponding terminals of elements 11 and 12 are connected to the contacts of relays 13 and 14, the armatures of these relays being shown connected to the other alternating current supply line 2. Relays 13 and 14 are preferably selected so that they can be properly operated from unidirectional current.

For selectively supplying current to the relays 13 and 14, rectifying means 16 is employed, which is connected to the current supply lines 1 and 2. This rectifying means has been conventionally represented by rectifying elements 17, connected together as shown to rectify both half cycles of the alternating current. Conductor 18 connects between rectifying means 16 and current supply line 2, while conductor 19 connects between the rectifying means and one terminal of a resistance 21. The other terminal of this resistance is connected to current supply line 1. Resistance 21 is sufficiently high in value to properly limit the current flow thru rectifying means 16. As indicated in Fig. 5, it is preferably positioned in such a manner as to cooperate with elements 11 and 12, to supply heat to the medium being heated.

The output circuit 22 of rectifying means 16 is of course supplied with rectified or unidirectional current. This output circuit normally includes the windings of relays 13 and 14, and is also associated with a temperature responsive switch 23. Thus one terminal of the winding of relay 13 is shown connected to rectifying means 16 by conductor 24. The other terminal of the winding of relay 13 is connected to one terminal of relay winding 14 by conductor 26. The other terminal of the winding of relay 14 is connected to rectifying means 16 by means of conductor 27, and is also connected to the temperature responsive member 28 of switch 23 by conductor 29. A movable portion of temperature responsive member 28 carries movable contacts 31 and 32, which cooperate respectively with contacts 33 and 34. Conductor 36 connects contact 33 with conductor 24, while conductor 37 connects contact 34 with conductor 26. Member 28 in this instance has been represented as being a bimetallic strip which will of course flex in accordance with temperature changes of the same. Contacts 31 and 32 carried by the movable end of this bimetallic strip, are arranged to successively contact with contacts 33 and 34. Thus as the temperature of member 28 increases above a certain value, contacts 32 and 34 close while contacts 31 and 33 remain open. If the temperature of member 28 continues to increase above another predetermined value, contacts 31 and 33 will also close. Similarly as the temperature of member 28 decreases below a predetermined value, contacts 31 and 33 will open, and if the temperature continues to increase below a second predetermined value, contacts 32 and 34 will open.

To explain the mode of operation of the system described above, it will be presumed that alternating current is supplied to lines 1 and 2, as by closing the main switch 38. Assuming that the temperature of the medium being heated, as for example the air with which elements 11 and 12 are in contact, is at a relatively low value, contacts 31 and 33, and also contacts 32 and 34 will be open. Therefore the rectified current supplied to circuit 22 will energize relays 13 and 14, thus closing their contacts and causing current to be supplied to both elements 11 and 12. Now if the temperature of the medium increases above a predetermined value, say 70°, contacts 32 and 34 are closed, thus short circuiting the winding of relay 14 and causing this relay to open. Current is therefore interrupted to element 12 but element 11 continues to supply heat. If the temperature of the medium should continue to increase above a second predetermined value of say 75°, contacts 31 and 33 will also be closed, thus short circuiting the windings of both relays 13 and 14. Opening of the contacts to relay 13 will cause deenergization of element 11, thus permitting the medium to cool. As the temperature decreases, contacts 31 and 33 will first open to cause closing of relay 13 and to cause current to again be supplied to element 11, and if the temperature continues to fall, contacts 32 and 24 are also opened to remove the short circuit from relay 14 and to cause element 12 to be energized. Of course when operating in this manner it is presumed that the medium being heated by elements 11 and 12 is also in heat transferring relationship to the members 28 of temperature responsive switch 23. Current is continuously supplied to resistance 21 as long as switch 38 is closed. The value of resistance 21 is of course sufficiently high that the heat supplied by it is not sufficient to raise the temperature of the medium being heated, without the added assistance of elements 11, 12, or both.

It is of course apparent that in place of utilizing two elements 11 and 12 both controlled by separate relays 13 and 14, the principles of my invention can be incorporated with a single electrical heating element controlled by a single relay. Likewise more than two electrical heating elements can be employed controlled by more than two relays.

In Fig. 6 I have shown a modification of the system shown in Fig. 5, which eliminates the necessity of utilizing a separate resistance 21. In this case another heating element 10 is provided similar to the elements 11 and 12. The terminals of element 10 are directly connected across the lines 1 and 2, and a tap 41, taken off the element 10, is connected to conductor 19 of rectifying means 16. By properly locating tap 41, the potential between this tap and line 1 is of proper value for supplying rectifier 16. The operation of this system is the same as that described with reference to Fig. 5, except that the element 10 is always connected as long as switch 38 is closed. Current is selectively supplied to elements 11 and 12 to maintain the temperature of the medium being heated near a desired value.

In Figs. 1 to 4 inclusive, I have shown suitable apparatus incorporating the invention described above, which is intended for heating air within a room. This apparatus includes the electrical heating elements 111 and 112, which can be formed by electrical resistance conductors wound upon suitable hollow refractory cores. A resistance conductor corresponding to the resistance 21 can be supported upon the same refractory core as is employed for element 111. These elements are shown positioned within a metal shell 42, which in turn is positioned within a suitable housing 43. This housing can be formed so that it can be set within a wall recess flush with outer wall surface. A foraminous guard or grille 44 extends over the open faces of the housing 43 and shell 42. Shell 42 is preferably spaced from the housing 43 so that convection currents of air may enter the lower portion of the housing from the room, pass upwardly thru the space 45 between the shell 42 and housing 43, and out thru the upper portion of the housing. Convection currents may also pass upwardly thru the upright openings 46 in the cores of the heating elements 111 and 112. Relays 113 and 114, corresponding to relays 13 and 14 of Fig. 5, are associated with each element 111 and 112. These relays are preferably disposed in the lower part of the housing below the elements 111 and 112, in such a manner as not to be detrimentally heated either by radiated heat or of hot convection currents of air.

The preferred construction for relays 113 and 114 is shown in detail in Figs. 2 and 4. Thus the flux path of each relay includes a member 40, preferably formed L-shaped. The winding 47 of each relay is shown disposed about a magnetic core 48, which can be in the form of a bolt for securing both the winding and core to member 40. To facilitate manufacture and assembly, each relay is preferably supported by the base portion 49 of its associated heating element. Accordingly in Fig. 2 I have shown a conductor bar 51 secured to base portion 49, as by means of bolt 52, and having its lower depending end directly secured to core 48 of winding 47. Terminal 53 of the heating element resistance wire is electrically connected to bar 51, as by bolt 52.

The armature 56 of each relay is movably supported by having its one end connected to a spring metal strip 57. That part of member 40 which is adjacent armature 56, forms what can be termed a pole portion 58. Armature 56, together with core 48 and member 40, form substantially a closed magnetic circuit. For making electrical connection with leaf spring 57, and thus to armature 56, I provide a connection terminal 59, which can be formed by L-shaped member 60, screw 61, and cooperating clamping member 62. Member 60 is clamped to the depending bar 51, by means of screw 63, and is insulated therefrom by means of insulating washers 64 and 66. One end of strip 57 can be interposed between member 60 and insulation 64, thereby being securely clamped to the bar 51. Another spring strip 67 can be clamped between member 60 and spring strip 57, and the lower end portion 68 of strip 67 terminates in such a position as to limit opening movement of armature 56.

The stationary contacts 69 of the relay described above, are preferably mounted directly upon the pole portion 58 and cooperate with contacts 71, carried by the armature 56. A small portion 72 of non-magnetic material, also projects from the inner face of armature 56 in such a position as to contact with the adjacent face of core 48.

Convenient connections can be made to each relay and its associated heating element, by means of connection terminal 59, and a binding post 73 provided on member 40. Normally contacts 69 and 71 are separated, and likewise portion 72 is spaced from the adjacent portion of core 48. When winding 47 is energized however, the armature is moved to closed position, in which contacts 69 and 71 are closed, and portion 72 is brought into engagement with core 48. In this closed position, it will be noted that air gaps between the armature and the other parts of the relay are extremely small, and the magnetic force upon armature 56 is carried by three points, two points being formed by contacts 69 and 71, and the third point being formed by portion 72. Thus positive physical engagement between contacts 69 and 71 is insured.

Likewise positioned in the lower part of the heater housing 43, I provide the rectifier cells 117, which are preferably of the dry type. These cells can be conveniently mounted upon the bottom wall 76 of the housing. Temperature responsive switch 123, corresponding to the diagrammatic switch 23 of Fig. 5, is positioned in the lower part of the housing in the path of convection currents of air entering the same, and can likewise be mounted upon bottom wall 76 as shown.

A desirable type of switch 123 is shown in detail in Figs. 2 and 3. It includes a relatively rigid rod 77, cooperating with a helically wound metal strip 78. One end of rod 77 projects thru a casing 79, and is provided with a manual control lever 81. A member 82 is freely rotatable about rod 77, and carries resilient spring contact strips 131 and 132. The contacts of strips 131 and 132 are adapted to cooperate with relatively stationary contact strips 133 and 134. The outer end of rod 77 is secured to the corresponding end of wound strip 78, as by means of pin 83, and the other end of strip 78 is secured to a hub 84 formed on member 82. Strip 78 is made of two layers of metals having different temperature coefficients of expansion, so that it will tend to unwind when heated, thus causing relative angular movement between member 82 and rod 77 corresponding to temperature changes. Rod 77 can be set in any desired angular position, by means of lever 81. To frictionally retain rod 77 in any desired adjusted position, a compression spring 86 is shown inserted between lever 81 and a washer 87 engaging the adjacent wall of casing 79. Contact strips 131—132, and 133—134, of course correspond to contacts 31, 32, 33 and 34 of Fig. 5, and are likewise offset in such a manner as to close and open successively. Contacts 133 and 134 can be mounted in an insulating block 88, which can also carry a terminal strip 89. Strip 89 of Fig. 2 is shown connected to strips 131 and 132, by means of resilient conductor 90. As switch 123 is normally mounted within the heater, the handle of lever 81 projects thru an opening in grille 44, as shown in Fig. 2, so that it is readily accessible for manual adjustment.

The construction and arrangement of parts incorporated in the heater described with reference to Figs. 1 to 4 inclusive, has many desirable characteristics. For example the relays 113 and 114 are assembled together with and are supported by the heating elements 111 and 112. Furthermore since the relays are below the heating elements 111 and 112, and are also in the path of convection currents of air entering the lower portion of the heater housing, they are kept at a relatively low temperature consistent with long and reliable operating service. Rectifying cells 117 are similarly mounted with respect to the elements 111 and 112, and with respect to the convection currents of air. The temperature responsive switch 123 likewise has its temperature responsive strip 78 exposed to the convection currents of air entering the lower portion of the heater housing, thereby causing the switch to be operated in accordance with the temperature of air in the room entering the heater. Thus when this heater is operated within a room, the temperature of the air within the room can be maintained within relatively close temperature limits, thus preventing wasting of electrical energy in case the heater is kept operating over a relatively long period. The main switch, indicated at 138 (Fig. 1), is also preferably mounted upon the heater housing, and of course corresponds to the switch 38 in Figs. 5 and 6. As has been previously explained, as long as main switch 138 is closed, resistance 21 is being supplied with electrical energy, irrespective of whether or not elements 111 and 112 are being energized. The amount of heat given off by resistance 21 is sufficient to maintain a certain amount of circulation of convection currents of air thru the heater housing, thereby insuring that switch 123 will properly function in accordance with the temperature of air within the room.

I claim:

1. In an electrical air heater, a plurality of electrical heating elements, a housing in which said elements are disposed, a plurality of relays associated with said elements and arranged to control the supply of current to the same, said relays being disposed below said elements and within said housing, temperature responsive means for controlling energization of said relays to selectively energize certain ones of electrical heating elements, and one of the heating elements being out of the control of said relays, said last mentioned heating element serving to cause circulation of convection currents of air about said relays irrespective of the actuated or non-actuated condition of the relays.

2. In an electrical air heater, a plurality of electrical heating elements, a housing in which said elements are disposed, said housing being formed to permit convection currents of air to flow through the same, a temperature responsive means disposed within said housing and in the path of said convection currents of air, said means serving to control supply of current to certain of said elements, one of said elements being out of control of said temperature responsive means, said last mentioned element serving to cause circulation of convection currents of air through said housing irrespective of the conditioning of said temperature responsive means.

3. In an electrical air heater, a plurality of electrical heating elements, one of which is of substantially higher resistance than the others, a housing in which said elements are disposed, said housing being formed to permit flow of convection currents of air through the same, temperature responsive means disposed within said housing and in the path of said convection currents of air, said means serving to control supply of current to certain of said elements, said one element being out of control of said temperature responsive means, said last mentioned element serving to cause circulation of convection currents of air through said housing irrespective of the conditioning of said temperature responsive means.

ARTHUR J. KERCHER.